Jan. 21, 1964  S. W. CERAMI  3,118,579
TUBULAR KNIT MATERIAL STRETCHER AND STEAMER
Filed Feb. 12, 1962  3 Sheets-Sheet 1

INVENTOR.
SAMUEL W. CERAMI
BY
ATTORNEY

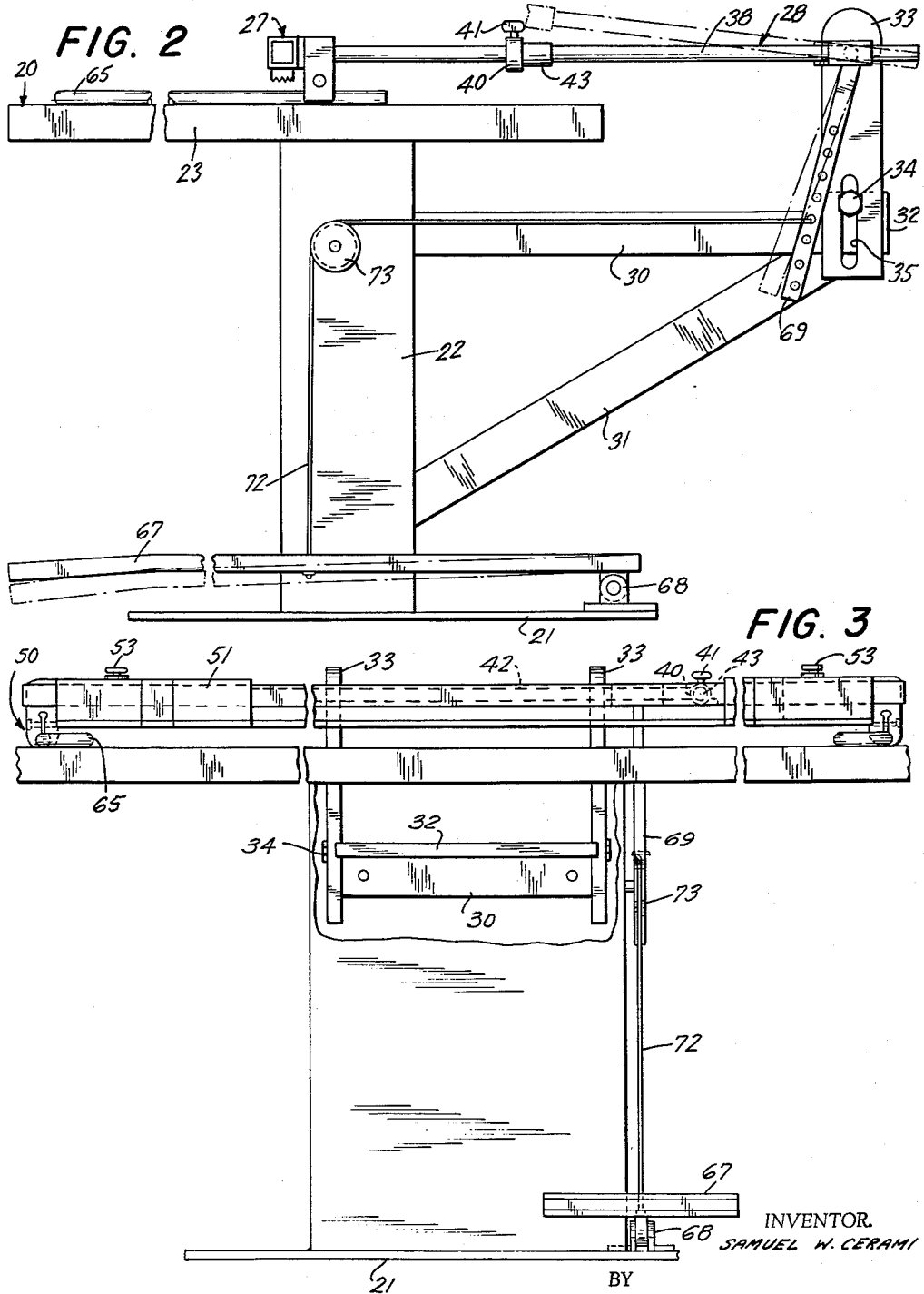

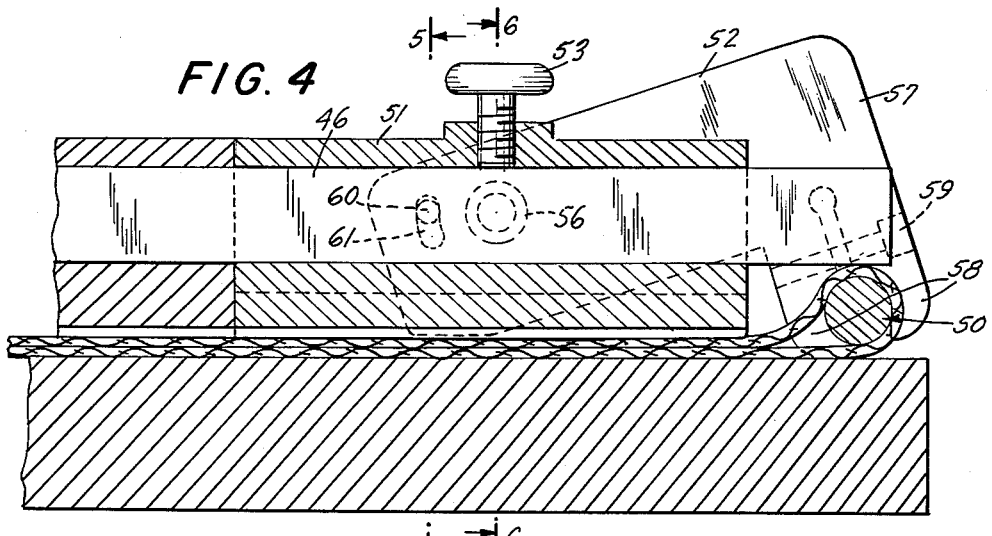
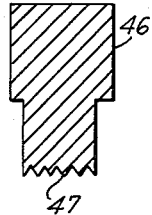
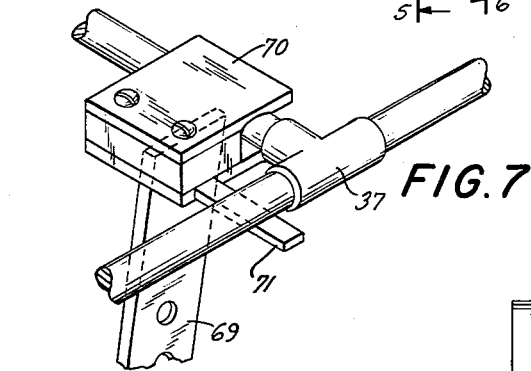
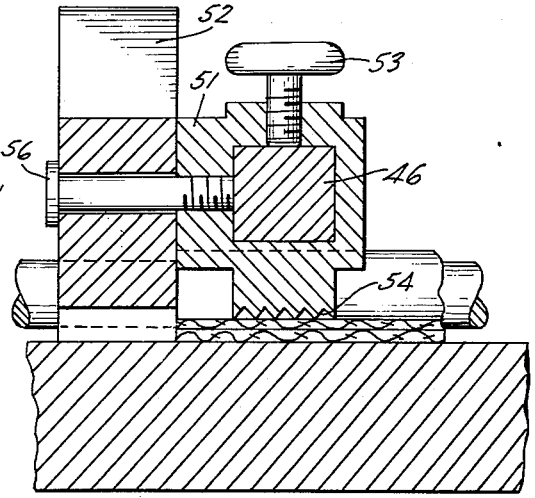
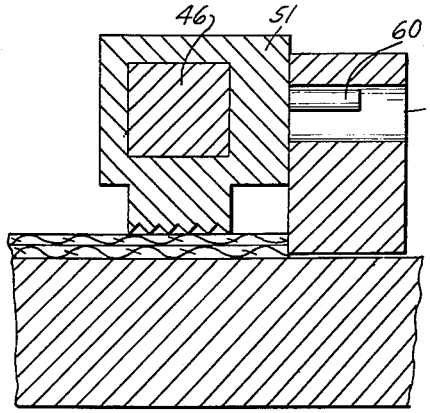

United States Patent Office 3,118,579
Patented Jan. 21, 1964

3,118,579
TUBULAR KNIT MATERIAL STRETCHER AND STEAMER
Samuel W. Cerami, 85 Orange Ave., East Paterson, N.J.
Filed Feb. 12, 1962, Ser. No. 172,538
6 Claims. (Cl. 223—70)

This invention relates generally to apparatus for stretching and blocking tubular knit material, such as employed in sweaters and other knit garments.

As is well known to those versed in the art, tubular knit material is usually sized or blocked, as by stretching and steaming. While various apparatus have heretofore been proposed for use in the performance of this operation, such devices have not been entirely satisfactory. For example, earlier devices have required excessive exertion of an operator in manipulating the knit material, so that operators tire quickly and require frequent rest periods, all of which reduces output and raises costs. Also, prior devices were relatively large and cumbersome in construction, substantial parts thereof necessarily being outboard of the steam table; and, the previous devices were capable only of lateral stretching so that longitudinal stretching required an entirely separate operation.

Accordingly, it is a general object of the present invention to provide apparatus which overcomes the above-mentioned difficulties, greatly facilitating an operator's handling of the knit material so that worker output is considerably enhanced, wherein the device is relatively compact and simple in construction having relatively little structure outboard of the steam table, and further including highly advantageous means for holding the material being operated upon to enable longitudinal stretching thereof.

The invention further contemplates the provision of a unique and highly improved apparatus of the type described, having the advantageous characteristics mentioned in the preceding paragraphs, which is extremely simple, sturdy and durable in construction, economical to manufacture and sell, and which effects substantial economies in use.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIG. 2 is a side elevational view showing the apparatus of FIG. 1.

FIG. 3 is a front elevational view showing the apparatus of FIGS. 1 and 2.

FIG. 4 is an enlarged partial sectional view taken substantially along the line 4—4 of FIG. 1.

FIG. 5 is a sectional view taken substantially along the line 5—5 of FIG. 4.

FIG. 6 is a sectional view taken substantially along the line 6—6 of FIG. 4.

FIG. 7 is an enlarged fragmentary perspective view showing certain elements of the instant apparatus.

FIG. 8 is a fragmentary sectional view taken substantially along the line 8—8 of FIG. 1.

Figure 1:
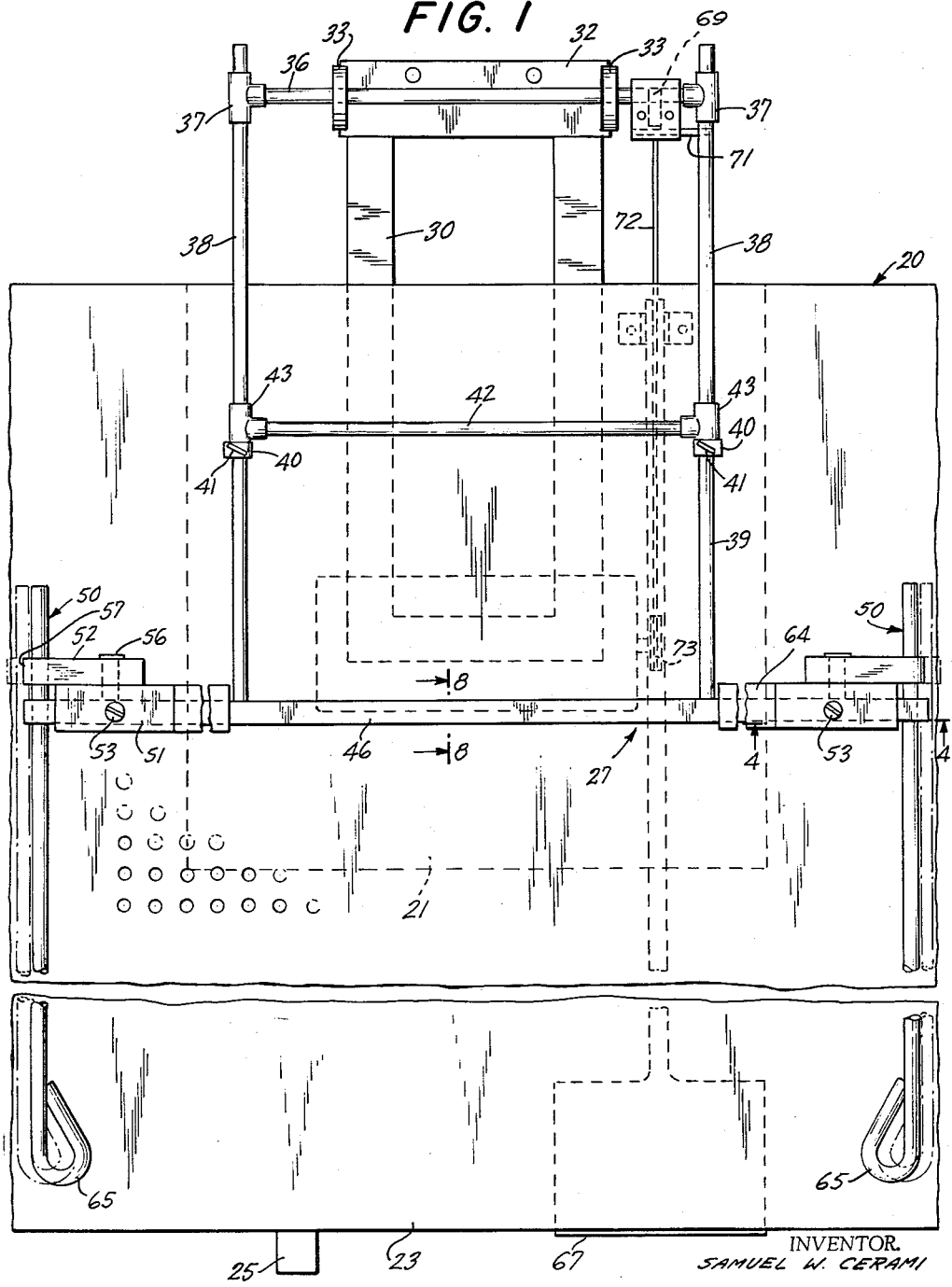
FIG. 1 is a top plan view showing the blocking or sizing apparatus of the present invention, the steam table being broken away to conserve drawing space, with the apparatus shown in phantom lines in its normal or rest position, and illustrated in solid in an elevated position for receiving a tubular knit article.

Referring now more particularly to the drawings, and especially to FIGS. 1–3 thereof, it may there be seen that the instant apparatus includes a table generally designated 20, having a base 21 adapted to rest on a supporting surface or floor, a column or pedestal 22 upstanding from the base, and a generally horizontal top or bed 23 which may have its upper side reticulate or perforate for emitting steam, all of which may be conventional. Any suitable steam control, such as a pedal 25 may be employed to effect emission of steam from the upper side of the table top or bed 23 in the manner desired.

Arranged directly above or over the table 20 is a holding mechanism, generally designated 27, which is generally horizontal and extends laterally of the apparatus. The holding mechanism 27 is mounted by support means, generally designated 28 for up-and-down, or generally vertical movement toward and away from the table top 23.

The support means 28 may include a support element 30 fixed to the column 22 and extending generally horizontal rearwardly therefrom beyond the rear side of the table top 23, and a diagonal brace 31 extending obliquely upward between a lower region of the column 22 and a rearward region of the member 30 to rigidify the latter. A journal mount or base 32 is fixed to the horizontal element 30 at its rearward end, and supports a pair of laterally spaced upstanding, pedestal journals 33. As best seen in FIG. 2, the pedestal journals 33 are vertically adjustable on the journal mount 32, as by a pin-and-slot connection 34, 35.

A generally horizontal, laterally extending shaft 36 is rotatably supported in the journals 33, and has its opposite ends provided with connectors, such as T fittings 37, each of which couples a respective arm 38 to the associated end of shaft 36. That is, each arm 38 extends forward from a respective end of shaft 36, the arms 38 being substantially coplanar and rotatable about the horizontal axis of the shaft 36. The arms 38 may be of sectional construction, each including a telescopic forward-end extension 39 adjustably fixed at a selected extended length by a collar 40 and setscrew 41. Rigidifying the arm structure may be a lateral bar or rod 42 extending between the arms 38 and fixedly secured to the respective arms by any suitable means, such as the T connections 43.

The material-holding means 27 extends laterally between and is fixed to the forward ends of arms 38, as at the forward ends of arm extensions 39. The holding means may include a generally horizontal, laterally extending beam or bar 46 located directly over the table top 23 and fixedly secured by any suitable means to the forward ends of arm extensions 39. The bar 46 may have its underside provided with suitable formations for holding engagement with knit material, such as longitudinally extending ribs 47 (see FIG. 8). Of course, other suitable formations, such as serrations, frictional material, or teeth may also be employed, as desired. As seen in FIG. 8, the formations 47 may be integral with or fixedly secured to the bar 46. These fixed formations 47 advantageously terminate proximate to the forward ends of arm extensions 39, for a purpose appearing presently.

As best seen in FIGS. 1 and 2, a pair of stretcher members or rods, generally designated 50, extend generally forwardly and rearwardly at spaced locations along the holding bar 46. More specifically, the stretcher members 50 are each mounted on the holding bar 46 by a sleeve 51 and a wing member 52. Each sleeve 51 is adjustably positionable along the holding bar 46, laterally outward of the arms 39, and may be fixed to the holding bar 46 at any selected position by a setscrew 53 having its head upstanding from the sleeve. The underside of each sleeve 51 is provided with knit-material-engaging formations 54, see FIG. 6, of the same general type as provided directly on the underside of the bar 46 at 47.

A generally horizontal, forwardly and rearwardly extending pivot pin 56 projects from each sleeve 51 and through the associated wing member 52 to pivotally connect the latter to its adjacent sleeve. Each wing member 52 has one end 57 projecting laterally outward and provided with jaws 58 actuable by a fastener 59 for releasably gripping a stretcher rod 50. Each wing member 52 is swingably within limits, as defined by a pin-in-slot connection 60, 61 (see FIGS. 4 and 5), between the wing member and its carrying slide 51. Thus, each wing member is swingable between a depending position, as shown in FIG. 3, and a laterally outward or outstanding position, as shown in FIG. 4, the stretcher members 50 being moved away from each other upon movement of the wing members laterally outward, and towards each other upon wing-member movement to their depending positions.

In accordance with the position of adjustment of the wing-member mounting slides 51 along the holding bar 46, a number of filler slides 64 may be engaged over the holding bar between each slide 51 and the adjacent arm extension 39. Each of the additional filler slides 64 is provided on its underside with suitable knit-material-engaging formations, such as ribs, teeth, serrations or the like, to the end that substantially the entire length of the laterally disposed holding means between the stretcher members 50 includes the downwardly facing material-engaging formations.

The stretcher members 50 may each be formed of an elongate bar or rod, preferably having its forward end smoothly bent inward, as at 65, say to define an inturned loop.

Mounted on the base 21 of the table 20 may be an actuating pedal 67 having its rear end journaled, as at 68, FIG. 2, and its forward end swingable up and down for foot actuation by an operator. An operating arm 69 is swingably mounted on the shaft 36 (See FIGS. 1 and 7), by a block 70 rotatably embracing the latter shaft; and, a bar 71 may extend from the block 70 beneath the adjacent arm 38 to swing the latter upward upon upward or forward swinging movement of the arm 69. A flexible line or chain 72 may extend forward from a selected region of the operating arm 69, over a pulley or wheel 73 mounted on the column or pedestal 22, and thence downward for connection to a medial region of the pedal 67. Hence, upon depression of the pedal 67, the line 72 causes upward swinging movement of the operating arm 69, which in turn swings the mounting arms 38 upward about the axis of shaft 36.

In operation, the holding means 27 normally rests on the upper surface of the steam table 23. In this condition, the formations 47 on the underside of bar 46, the formations on the undersides of sleeves 64, and the formations 54 on the undersides of sleeves 51 all rest on the upper surface of the steam table. Also, the freely swingable wing members 52 are swung laterally outward to move their stretcher members 50 away from each other, with the stretcher members substantially coplanar with the material-engaging formations (see FIG. 4). Upon upward swinging movement of the holding means 27, by depression of the pedal 67 as described hereinbefore, the bar 46, sleeves 64 and 51 are all raised away from the steam table 23, and the wing members 52 fall freely to their limiting depending positions, with the stretcher members moving toward each other. In this raised position, an operator may slip a tubular knit garment over both the stretcher members 50 and beneath the holding means 27. The holding means is then lowered by releasing the pedal 67. By the downward force of the holding means, the wing members 52 are swung laterally outward, thereby moving apart the stretcher members 50 and stretching the tubular knit material, as desired. Further the tubular knit material is held firmly against the steam table 23 by the formations 47, 54 and those on the undersides of sleeves 64, so that the material may be manually pulled forward and stretched longitudinally to the desired extent.

It will be apparent that the operator's foot is not required for actuation of the pedal 67 during the actual stretching of a knit tube, either laterally or longitudinally, so that the steam pedal 25 may be conveniently operated, as desired, for effective steaming and blocking of the material. A third pedal may then be operated to send a blast of air to cool and set the material. After the desired stretching and blocking, the pedal 67 is again depressed to raise the holding means 27 and stretcher members 50, the latter simultaneously swinging inward toward each other to release tension upon the knit tube and permit its easy removal.

The device may also conveniently be used for stretching and blocking flat knit fabric, merely by removing the stretcher members 50 or even removing the wing sleeves 51 and clamping the fabric to the table by engaging the fabric under the sleeves 64 and the holding means 46. The front edge of the fabric may then be stretched and steamed and set.

From the foregoing, it is seen that the present invention provides a blocking or sizing apparatus for knit tubular material which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Apparatus for blocking tubular knit material comprising a steam table, a laterally disposed holding beam over said table and mounted for generally vertical movement toward and away from said table, holding formations on the underside of said beam for firmly holding knit material against said table, a pair of wing members mounted at spaced locations on said holding beam for movement toward and away from each other upon respective up-and-down movement of said holding beam, and a pair of stretch members extending forward from respective wing members and movable therewith toward and away from each other, whereby said stretch members and holding beam are adapted to engage a knit tube to stretch the same laterally upon movement of said stretch members away from each other and hold one end of said tube against said table by said holding formations to enable longitudinal stretching of said tube.

2. Apparatus according to claim 1, said wing members being selectively positionable along said holding beam, and a plurality of sleeves removably engageable over said holding beam between said wing members, and holding formations being provided on the undersides of said sleeves.

3. Apparatus according to claim 1, said holding beam normally resting on said table, and foot-actuable means connected to said holding beam for raising the latter.

4. Apparatus according to claim 1, said wing members being pivotally mounted on said holding beam for swinging movement between a normal depending position toward each other and an outstanding position away from each other upon engagement with said table.

5. Apparatus for blocking tubular knit material comprising a steam table, laterally disposed holding means located over said table, support means mounting said holding means for up-and-down movement over said table, laterally spaced stretch members extending generally forward from said holding means, and mounting means mounting said stretch members on said holding means for lateral movement toward and away from each other upon respective up-and-down movement of said holding means, said holding means comprising a lateral beam movable generally vertically toward and away from said table, and material-engaging formations on the underside of said beam for firmly holding material against said table.

6. Apparatus for blocking tubular knit material comprising a steam table, laterally disposed holding means located over said table, support means mounting said holding means for up-and-down movement over said table, laterally spaced stretch members extending generally forward from said holding means, and mounting means mounting said stretch members on said holding means for lateral movement toward and away from each other upon respective up-and-down movement of said holding means, said support means comprising a horizontal support element extending rearwardly beyond the rear edge of said table, a journal mount fixed to the horizontal support element at its rearward end, a pair of laterally spaced pedestal journals upstanding from and vertically adjustable relative to said journal mount, a pair of arms mounted on said journals for swinging movement about a generally horizontal axis and extending forward from said journals over said table, said holding means being carried by the forward regions of said arms.

References Cited in the file of this patent

UNITED STATES PATENTS

| | | |
|---|---|---|
| 1,142,431 | Hoffman | June 8, 1915 |
| 2,457,476 | Kaplan | Dec. 28, 1948 |
| 2,493,864 | Forman | Jan. 10, 1950 |
| 2,990,984 | Fiduccia | July 4, 1961 |